Sept. 14, 1943.   A. F. SYVERUD   2,329,666
DISPENSING DEVICE
Filed March 20, 1940
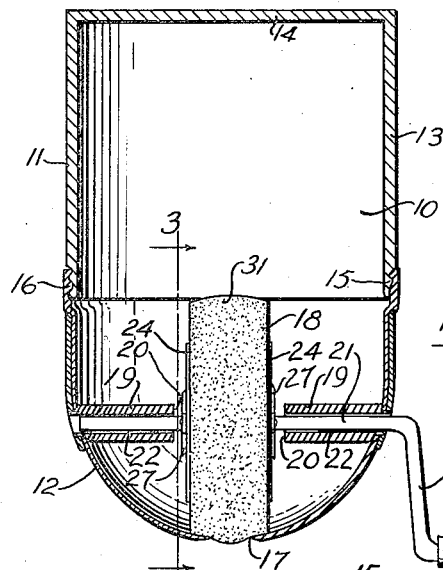
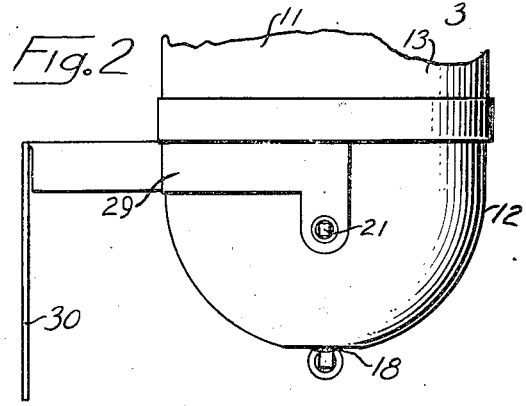
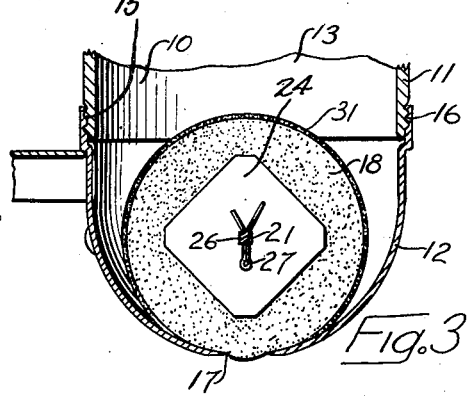
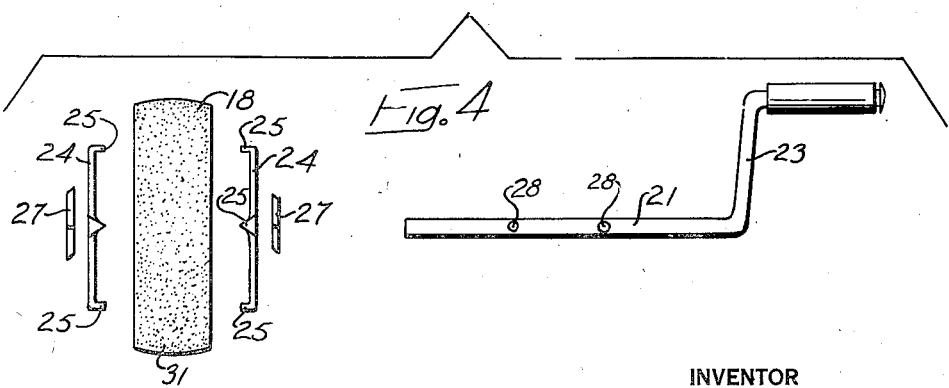
INVENTOR
ANNAR FRIDTJOV SYVERUD
BY
G. H. Braddock
ATTORNEY Patented Sept. 14, 1943

2,329,666

UNITED STATES PATENT OFFICE 2,329,666

DISPENSING DEVICE

Annar Fridtjov Syverud, Minneapolis, Minn.

Application March 20, 1940, Serial No. 325,007

1 Claim. (Cl. 221—106)

This invention has relation to a device adapted to be employed for the purpose of dispensing various materials, but which has been designed to be more especially useful to the purpose of dispensing powdered or relatively thick liquid soap, or soap chips or flakes.

An object of the invention is to provide a dispensing device of the present general character which will be of novel, improved, quite simple and inexpensive construction.

A further object is to provide a dispensing device which will include several novel and improved features and characteristics of construction.

A further object is to provide a device for dispensing materials, such, for example, as powdered or liquid soap, or soap chips or flakes or paste, which will include a chamber for containing material, a dispensing outlet or opening leading from a lower portion of said chamber, and a relatively roughened member or sponge rubber disc adapted selectively to be permitted to remain stationary and to be rotated relatively to said dispensing outlet or opening, and in which device said member or disc when stationary will cause the dispensing outlet or opening to be sealed closed against the possibility of the passage of material from the chamber of the device and when rotated will cause material progressively to be fed from said chamber to said dispensing outlet or opening whence the material will be removed or fall by gravity from said device.

And a further object is to provide a dispensing device as stated in the immediately preceding paragraph, wherein the amount of material caused to be fed from said chamber for said dispensing outlet or opening of the device in response to rotation of said relatively roughened member or sponge rubber disc will be substantially proportional to the extent to which the member or disc is rotated.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claim which follows.

In the accompanying drawing forming a part of this specification,

Fig. 1 is a central, vertical, longitudinal sectional view of a dispensing device made according to the invention;

Fig. 2 is a fragmentary side elevational view of the dispensing device as seen from the left hand side in Fig. 1;

Fig. 3 is a vertical sectional view, taken as on line 3—3 in Fig. 1; and

Fig. 4 is an elevational view disclosing operative parts of the dispensing device in disassembled relation.

With respect to the drawing and the numerals of reference thereon, a chamber for containing material, such as powdered or liquid soap, or soap chips or flakes or paste, to be dispensed is represented generally at 10, and is provided, in the disclosure as made, by a container 11 consisting of a hollow, generally dome shape or bowl shape, lower member 12, and a hollow, cylindrical, upper member 13 having a closed upper end 14. The lower member 12 and the upper member 13 are detachably secured together so that material to be dispensed can be placed in the chamber 10. To this end, the upper margin or portion of said lower member 12 includes an annular, internal thread 15 adapted to removably receive an annular, external thread 16 upon the lower margin or portion of said upper member 13. The lower end of the upper member 13 and the upper end of the lower member 12 are open, the one to the other.

The base, which is a generally spherical part, of the lower member 12 has an opening 17 therethrough which is at the bottom of the chamber 10 and provides a dispensing outlet of the device leading from said chamber. Desirably, said dispensing outlet or opening 17 will be situated at the vertical axis of the dispensing device, or, stated differently, centrally of the lower portion of the chamber 10.

A relatively roughened member or sponge rubber disc 18 situated within the lower portion of the chamber 10 is adapted selectively to be permitted to remain stationary to cause the dispensing outlet or opening 17 to be sealed closed against the possibility of the passage of material from the chamber 10 and to be rotated within said chamber and relatively to said dispensing outlet or opening to cause material progressively to be fed from the chamber to the dispensing outlet or opening whence the material will be removed or fall by gravity from the device. And the construction and arrangement are such that the amount of material caused to be fed from said chamber 10 to said dispensing outlet or opening 17 in response to rotation of said member or disc 18 will be substantially proportional in extent to the extent to which the member or disc is rotated. That is, the amount of material fed out of the device will have direct relation to the extent of rotation of the member or disc 18. The feed will continue as long as the member or disc 18 is kept in rotation and will cease immediately upon cessation of the rotation of said member or disc.

More explicitly, the side wall of the lower member 12 of the container 11 rigidly supports oppositely disposed, inwardly extending bearing members 19, 19 the inner ends 20, 20 of which terminate in spaced apart relation to each other. The bearing members 19, 19 are situated in a lower portion of the chamber 10 at a slight distance from and above the dispensing outlet or opening 17 and extend diametrically and transversely of the container 11.

The relatively roughened member or sponge rubber disc 18 is fixedly supported upon a shaft 21 rotatably mounted, as at 22, 22, in the oppositely disposed bearing members 19, 19, and said member or disc 18 is situated within the chamber 10 between and in spaced relation to the inner ends 20, 20, respectively, of said bearing members 19, 19, desirably about as disclosed in Fig. 1. As shown, the shaft 21 is angular in cross-section, and a crank 23 upon said shaft and at the outer side of the dispensing device is for the purpose of rotating the shaft thus to cause the relatively roughened member or sponge rubber disc to be rotated.

As very clearly disclosed, the member or disc 18 is reinforced or strengthened at its opposite side surfaces, adjacent the bearing members 19, 19, by substantially rectangular metal plates 24, 24 which include integral prongs 25 at their corners. More explicitly, each metal plate 24 is in contiguous relation to a side surface of the member or disc 18, and all of the prongs 25 are imbedded in said member or disc 18. The margins or marginal edges of the metal plates 24, 24 desirably terminate within the circumference of the member or disc 18, as shown in Figs. 1, 3 and 4. Each metal plate 24 includes a central angular opening 26 which slidably but non-rotatably receives the angular shaft 21, and cotter pins 27, including a cotter pin at each side of the member or disc 18, are situated at the outer sides of the metal plates in spaced apart openings 28, 28 through said shaft 21. Said openings 28, 28 are so located in the shaft 21 relatively to each other that the cotter pins 27 will cause the metal plates 24, 24 to be retained in rigid, contiguous relation to the member or disc 18, and, too, said cotter pins constitute means which limit the extent of longitudinal movement of the shaft 21 in its bearings 19, 19. That is to say, there is a cotter pin 27 between each metal plate 24 and the adjacent bearing member. The cotter pins are spaced from each other a distance which is slightly less than the distance between the inner ends 20, 20 of the bearing members 19, 19, respectively, and upon slight longitudinal movement of the shaft 21 in either direction a cotter pin will engage the inner end of one or the other of said bearing members thus to limit the extent of longitudinal movement of said shaft 21, as well as lateral or sidewise movement of the relatively roughened member or sponge rubber disc 18. Clearly, the cotter pins 27 can be inserted in the openings 28 while the lower member 12 and the upper member 13 of the container are disassembled. It will be evident that the member or disc 18 is fixed to rotate with the shaft 21, when this is rotated, through the instrumentality of the metal plates 24, 24 secured, at the angular openings 26, upon said shaft to rotate therewith and the prongs 25 integral with said metal plates and imbedded in said member or disc at locations in spaced relation to the shaft 21.

A bracket or supporting means for securing the dispensing device upon a wall or other structure may be of any suitable and convenient construction. As disclosed, the dispensing device is adapted to be supported by an L-shape bracket including a horizontal portion 29 thereof which is rigid with the dispensing device and a vertical portion 30 thereof which is adapted to be made rigid with a wall or other structure.

The member or disc 18 is of annular configuration, and the periphery or outer surface 31 of said member or disc is curved in transverse direction and has width somewhat greater than the diameter of the dispensing outlet or opening 17, which, as shown, is circular. Also, the diameter of the member or disc 18 is considerably greater than the diameter of said outlet or opening 17. The surface 31 is of generally spherical configuration, as is also the internal surface of the container 11 at location adjacent to and about the dispensing outlet or opening 17 and the construction and arrangement are such that the periphery or outer generally sperical surface 31 of the member or disc 18 is adapted to cause the dispensing outlet or opening 17 to be completely covered, about as disclosed in Figs. 1 and 3, so that when said member or disc is stationary said outlet opening is sealed closed against the possibility of the passage of material from the chamber 10 of the device. That is to say, the member or disc 18 bears relation to the dispensing outlet or opening 17 such that the periphery or outer surface of said member or disc is in complete covering relation to said dispensing outlet or opening much, or about, the same as a valve when it is closed has relation to a valve seat. Actually, the outlet or opening 17 can be considered as an outlet passageway surrounded by a valve seat and the member or disc 18 can be considered as a valve-like controlling device or entity upon said valve seat in covering relation to said outlet or opening or outlet passageway. The construction and arrangement are also such that when the member or disc 18 is caused to be rotated the perimeter or outer surface 31 thereof will cause material progressively to be fed from the chamber 10 to the dispensing outlet or opening 17 whence the material will, naturally, be removed, or fall, by gravity from the device.

Evidently, the roughened outer surface 31 of the member or disc 18, when rotated within and relatively to material, such as soap, contained in the chamber 10, as well as relatively to the dispensing outlet or opening 17, will cause particles or pieces of the material to be conveyed to the location of said dispensing outlet or opening, and said particles or pieces will, obviously, thence be removed from the dispensing device by gravity. In some instances particles or pieces of material may be wiped by exterior parts of the surface 31 of the member or disc 18 to the outlet or opening 17, and in some instances particles or pieces of material may become positioned in concavities of said surface 31 and thus be fed to said outlet or opening 17. In all cases, the amount of material caused to be fed from the chamber 10 to the dispensing outlet or opening 17 in response to rotation of the member or disc 18 will have direct relation to the extent of rotation of said member or disc 18. That is, with rotation of the member or disc 18 through any given arc there will be deposit of material from the dispensing device in substantially fixed total amount, with increase of the extent of rotation the total amount of deposited material will be greater, and with decrease of the extent of rotation the total amount of deposited material will be less. Feed of material from the dispensing device will continue progressively and regularly as long as the member or disc 18 is kept in rotation, and feed from said device will terminate the instant said member or disc is permitted or caused to be stationary.

It has been found that a sponge rubber disc is entirely satisfactory to the performance of the services or functions for which the present dispensing device was devised. However, the relatively roughened member or disc 18 may in some instances be composed of substance other than sponge rubber.

What is claimed is:

A dispensing device comprising a container providing a chamber for receiving material, said container including a hollow, generally dome shape lower member and there being an outlet passageway leading from said chamber at a lower portion of said lower member, a valve seat upon said lower member in surrounding relation to said outlet passageway at the inner side thereof, bearing members supported by said lower member including inner ends of said bearing members disposed in spaced apart relation, a resilient member between and in adjacent relation to the inner ends of said bearing members and including an annular roughened outer surface of the resilient member of generally spherical configuration engaged against the whole of the periphery of said valve seat at the inner side thereof in covering relation to said outlet passageway, metal plates situated against the opposite side surfaces of said resilient member and rigid therewith, said metal plates being disposed between the resilient member and the bearing members, respectively, and there being an axial angular opening through said resilient member alined with angular openings through said metal plates, a shaft rotatably mounted in said bearing members and snugly received in the angular openings through the resilient member and the metal plates, means engaged with said shaft retaining each of said metal plates in contiguous relation with said resilient member and the resilient member fixed against sliding movement along said shaft, and a crank integral with said shaft at the outer side of said container.

ANNAR FRIDTJOV SYVERUD.